United States Patent
Taplin et al.

[15] 3,700,825
[45] Oct. 24, 1972

[54] CIRCUIT INTERCONNECTING CABLES AND METHODS OF MAKING SUCH CABLES

[72] Inventors: Stanley Donovan Taplin, Hitchin; Malcolm Jack Pettitt, Stevenage, both of England

[73] Assignee: International Computer Limited, London, England

[22] Filed: June 1, 1971

[21] Appl. No.: 148,369

[30] Foreign Application Priority Data

Oct. 1, 1970    Great Britain..........46,844/70

[52] U.S. Cl. ...174/36, 174/113 R;115;117 F;117 FF
[51] Int. Cl..............................................H01b 7/08
[58] Field of Search ...174/36, 117 F, 117 FF, 117 R, 174/113 R, 115

[56] References Cited

UNITED STATES PATENTS

| | | | |
|---|---|---|---|
| 3,612,744 | 10/1971 | Thomas | 174/117 FF |
| 3,576,941 | 5/1971 | Colglazier | 174/117 FF |
| 3,459,879 | 8/1969 | Gerpheide | 174/117 FF |
| 3,391,246 | 7/1968 | Freeman et al. | 174/117 FF |
| 3,179,904 | 4/1965 | Paulsen | 174/117 R X |

*Primary Examiner*—Lewis H. Myers
*Assistant Examiner*—A. T. Grimley
*Attorney*—Keith Misegades and George R. Douglas, Jr.

[57] ABSTRACT

A circuit interconnecting cable construction includes a cable having a group of side-by-side spaced apart conductors embedded in insulating material to provide a cable of tape like form with a surface substantially parallel to the conductors. An electrically conductive screen is located adjacent this surface and a lattice structure is placed between the screen and the surface to space the screen a predetermined distance from the conductors.

6 Claims, 4 Drawing Figures

CIRCUIT INTERCONNECTING CABLES AND METHODS OF MAKING SUCH CABLES

This invention relates to circuit interconnecting cables and more particularly to assemblies of such cables including a stack of tape-like insulated cables, and to methods of making such cable assemblies.

BACKGROUND OF INVENTION

It has been proposed to employ flat interconnecting cables for the distribution of electrical signals, for example, in electronic computers. Such cables commonly consist of a group of elongate conductors arranged side-by-side in flat formation within an enclosing sheath of insulating material, usually a synthetic plastics material. Although such cables offer considerable advantages from the point of view of ease of handling, convenience in designing cable layouts and in mechanically forming the required layouts in the computing apparatus, they possess a major disadvantage in that, due to the relatively large cross-sectional areas presented by conductors in alternate layers when several of the flat cables are superimposed on one another, significant cross-talk problems arise. In order to avoid severe mutual interference between such conductors it is desirable to employ conductive screens between the stacked cables, and to provide, for example, earth connections to the screens.

While the provision of rigid screens is relatively simple for fixed cable assemblies, difficulties arise, for example, where it is required to move the cables, such as, for example, where connections are required to be made to relatively moveable items of equipment, such as door-or gate-mounted equipment or where, for example, a complete equipment is built up by providing a number of separate units in a rack mounted array. It is desirable, moreover, when using thin dielectric cables, to space the screens a fixed predetermined distance from the conductors in order to obtain predictable capacitance and attenuation properties in the interconnections.

SUMMARY OF THE INVENTION

The invention is concerned with a cable assembly for interconnecting electrical circuits including at least one cable having a group of side-by-side spaced apart conductors embedded in insulating material to provide a cable of tape like form with a surface substantially uniformly spaced from the conductors, an electrically conductive screen arranged adjacent said surface to lie substantially parallel to the conductor group, and a lattice structure interposed between said screen as the insulating material to space the screen a predetermined distance from the conductors.

The lattice structures can be formed separately from the cable and subsequently attached thereto by suitable adhesive means. Alternatively the lattice structure can be formed integrally to the surface of the cable during the formation of the latter.

Preferably, to ensure that, when two or more cables are placed side-by-side to form a stack, the screens are equally spaced from each adjacent conductor group, a lattice structure is provided on each said surface. In practice, a screen is attached to only one lattice structure of each cable.

A further aspect of the invention provides method of making a circuit interconnecting cable assembly for interconnecting electrical circuits including the steps of providing a lattice structure on one face of a tape-like cable including a group of insulated conductors embedded in an insulating material and substantially equally spaced from said face and bonding an electrically conductive screen to an exposed face of the lattice structure so that the screen is spaced by a substantially constant distance from all of the conductors.

The lattice structures can be either formed separately from the cable and subsequently bonded thereto or formed integrally in the surfaces of the cable during manufacture of the latter.

BRIEF DESCRIPTION OF DRAWING

For a better understanding of the invention and to show how the same may be carried into effect reference will now be made to the accompanying drawings in which.

DESCRIPTION OF PREFERRED EMBODIMENT

Figure 1:
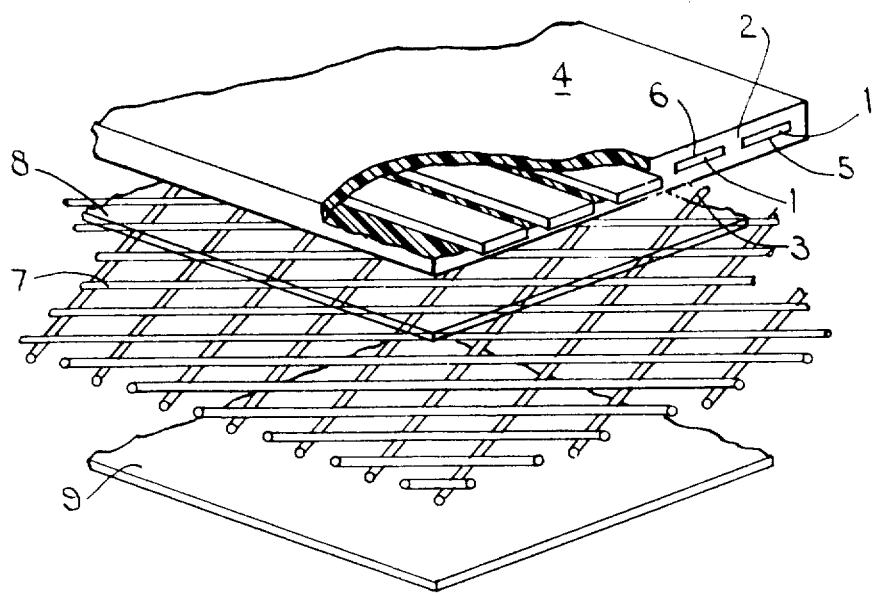
FIG. 1 is an exploded perspective view of a first embodiment of a cable according to the invention.
Figure 2:
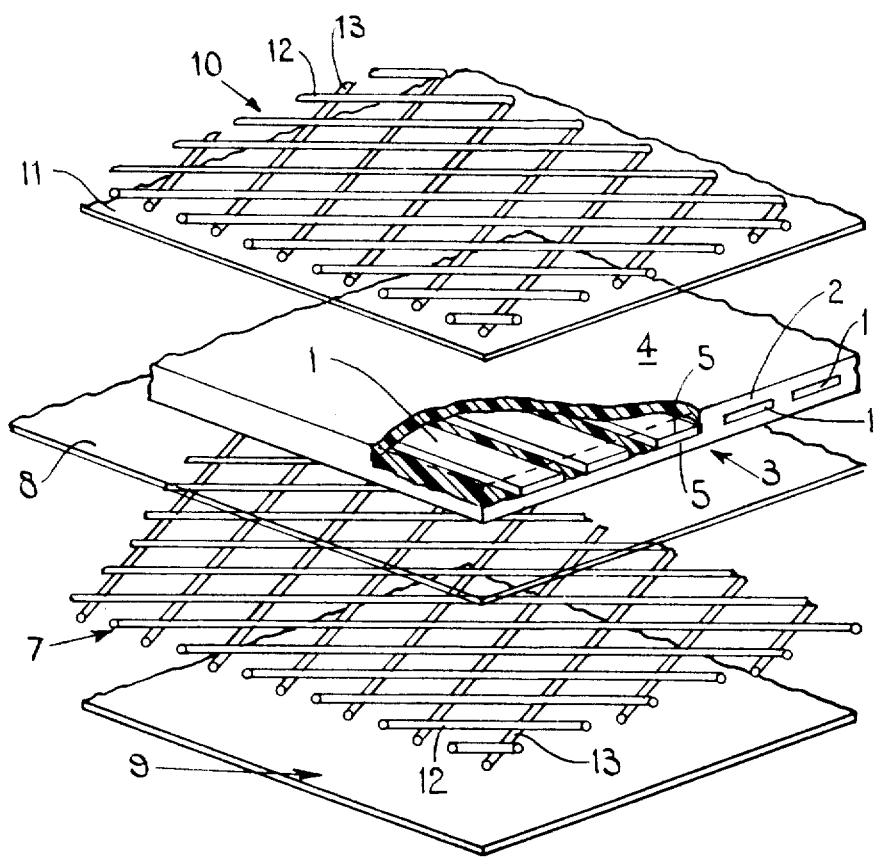
FIG. 2 is an exploded perspective view of a modified embodiment of a cable according to the the invention.

In FIG. 1 a plurality of elongate conductors 1 are arranged in side-by-side flat formation within an enclosing encapsulation 2 of insulating material usually a synthetic plastics material. The encapsulation or embedding is such as to produce a flexible tape like structure having two smooth or substantially smooth surfaces 3 and 4. As will be seen these faces are substantially parallel to and equally spaced from the adjacent flat surfaces 5, 6 of the conductors 1. A first spacing layer or lattice structure 7 is secured to the surfaces 3 by a suitable adhesive which can be a double sided adhesive tape schematically shown at 8. An electrically conductive screen 9 of for example copper foil is secured to the exposed surface of the lattice structure 7 to lie substantially parallel to the conductor group. The embodiment of FIG. 1 can be modified by adding a second lattice structure. This is shown in FIG. 2 in which a second spacing layer or lattice structure 10 is secured by a suitable adhesive, for example, a double sided adhesive tape 11 to the surface 4. In this FIG. 2, the construction is otherwise the same as that of FIG. 1.

Figure 3:
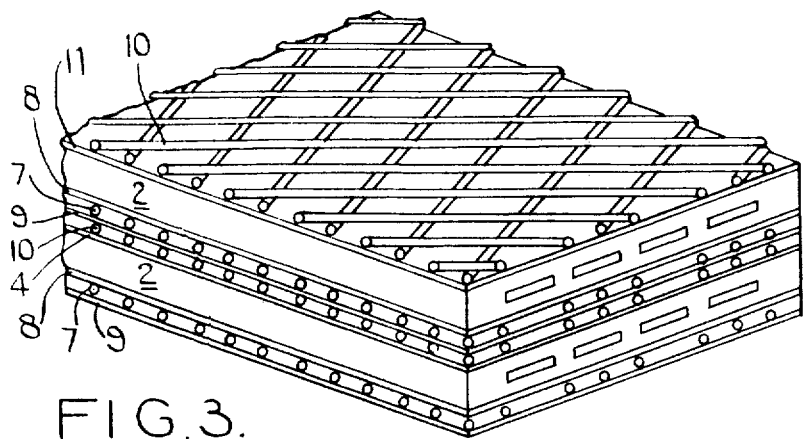
FIG. 3 is a schematic representation of an assembly of cables as shown in FIG. 2.

As will be seen in FIG. 3, when two or more of the cable structures as shown in FIG. 2 are arranged face-to-face to provide a stack of cables on which the conductors of each cable are symmetrically arranged along the center line of the cable stack the screens 9 are positioned equidistant from the conductors of the adjacent cables.

In practice it is desirable that the lattice members should be proportioned so that the majority of the space between cables and screens is constituted by air. The lattices consequently comprise a criss-cross arrangement of members 12, 13 having the appropriate dielectric propeties. A structure which has been formed to be satisfactory consists of a mesh formed from extruded nylon or polyvinylchloride and is commercially available under the Registered Trade Mark "Netlon." Use of this particular material enables approximately 80 percent of the space between the cable and the screen to constituted by air, and when used in conjunction with copper foil screen it has been found that the required flexibility of the cable is not seriously impaired.

Figure 4:
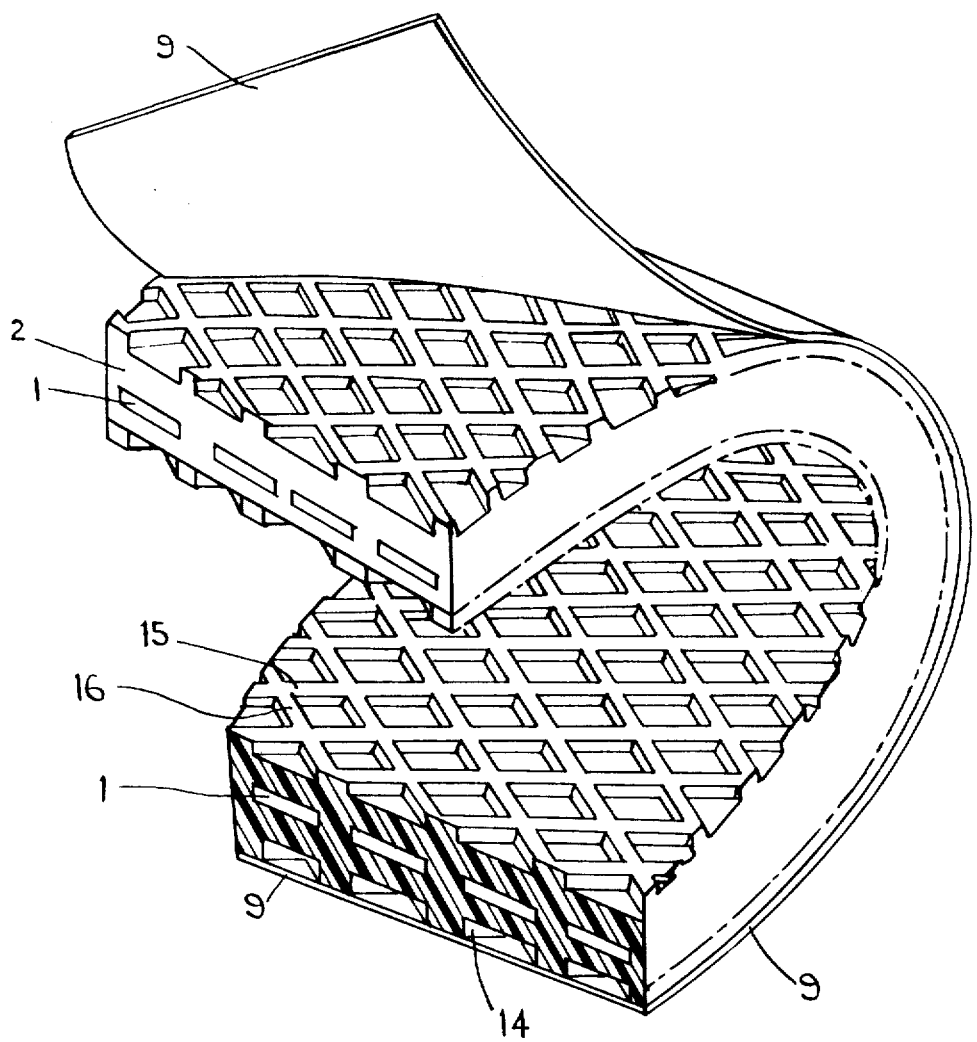
FIG. 4 is a perspective view of a length of a further embodiment of a cable incorporating the features of the present invention.

In the embodiment of FIG. 4, a lattice structure or honeycomb pattern 14 comprising wall elements 15, 16 is impressed into the surfaces of the insulating material of the cable during the manufacture of the latter. Consequently each lattice structure is integral with the cable itself. In this embodiment the screen 9 is secured to one of the faces of the cable itself.

It will be realized that the lattice structure does not need to be of the precise form shown in the drawings. For example, a woven mesh member, a moulded mesh member, a member made from slit and expanded sheet or a member punched from sheet would be satisfactory provided that the majority of the separation obtained consists of air. In this specification the term "lattice structure" is intended to cover all forms of open work meshes however made which provide that the majority of the resulting separation consists of air.

Furthermore, although the use of double sided adhesive tape has been proposed for the bonding of the lattice structures to the cable it will be realized however that the lattice structure may be bonded to the cable and screen in other ways such as, for example, directly by means of an adhesive.

We claim:

1. A cable assembly for interconnected electrical circuits including at least one cable having a group of side-by-side spaced apart conductors embedded in insulating material to provide a cable of tape like form with a surface substantially uniformly spaced from the conductors, an electrically conductive screen arranged adjacent said surface to lie substantially parallel to the conductor group, and a lattice structure interposed between said screen and the insulating material to space the screen a predetermined distance from the conductors.

2. A cable assembly as set forth in claim 1, in which the cable includes a second surface substantially uniformly spaced from the conductors, and a second lattice interposed between the second surface and a second screen.

3. A cable assembly as set forth in claim 2, in which each lattice structure is initially separate from the insulating material and is attached to its associated surface.

4. A cable assembly as set forth in claim 3, in which each lattice structure is secured to the associated one of said surfaces by double sided adhesive tape.

5. A cable assembly as set forth in claim 2, in which each lattice structure is formed integrally in the insulating material.

6. A cable assembly as set forth in claim 1 in the lattice structure is so proportioned that the majority of the space between the screen and cable is air.

* * * * *